United States Patent
Wei et al.

(10) Patent No.: US 7,401,967 B2
(45) Date of Patent: Jul. 22, 2008

(54) PRISM SHEET AND BACKLIGHT MODULE INCORPORATING SAME

(75) Inventors: Ying Wei, Shenzhen (CN); Ching-Huang Lin, Miao-Li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 82 days.

(21) Appl. No.: 11/414,929

(22) Filed: May 1, 2006

(65) Prior Publication Data

US 2006/0245212 A1    Nov. 2, 2006

(30) Foreign Application Priority Data

Apr. 29, 2005    (CN) .................... 2005 2 0057962 U

(51) Int. Cl.
*F21V 5/02* (2006.01)

(52) U.S. Cl. ........................ 362/626; 362/607; 362/339

(58) Field of Classification Search ................. 362/626, 362/606, 607, 311, 339
See application file for complete search history.

(56) References Cited

U.S. PATENT DOCUMENTS

| 5,844,720 | A | 12/1998 | Ohara et al. | |
|---|---|---|---|---|
| 6,441,551 | B1* | 8/2002 | Abe et al. | 313/503 |
| 2004/0061944 | A1* | 4/2004 | Kashima et al. | 359/599 |
| 2004/0066645 | A1* | 4/2004 | Graf et al. | 362/31 |
| 2004/0190102 | A1* | 9/2004 | Mullen et al. | 359/237 |
| 2005/0046321 | A1* | 3/2005 | Suga et al. | 313/112 |

* cited by examiner

*Primary Examiner*—Laura Tso
(74) *Attorney, Agent, or Firm*—Wei Te Chung

(57) ABSTRACT

A prism sheet (10) includes a substrate (12) and a plurality of prism structures (14). The substrate includes a plurality of diffusing particles (122) dispersed therein. The prism structures are at a light output side of the substrate. The diffusing particles can diffuse light beams traveling through the substrate. This configuration performs the same function as that of a diffusing sheet of a conventional backlight module. The prism structures can gather light beams to improve a brightness of a backlight module (6) incorporating the prism sheet. Thus, the backlight module can provide bright and uniform light at a low cost and while having a reduced thickness.

19 Claims, 3 Drawing Sheets

PRISM SHEET AND BACKLIGHT MODULE INCORPORATING SAME

FIELD OF THE INVENTION

The present invention relates to a prism sheet and a backlight module for an apparatus such as a liquid crystal display device.

GENERAL BACKGROUND

Liquid crystal displays (LCDs) are commonly used as display devices for compact electronic apparatuses, because they not only provide good quality images with little power but are also very thin. The liquid crystal molecules in an LCD do not emit any light themselves. The liquid crystal molecules have to be lit by a light source so as to clearly and sharply display text and images. Thus, a backlight module for an LCD is generally needed. A prism sheet is generally needed in a backlight module for improving a brightness of the backlight module.

Referring to FIG. 7, a conventional prism sheet 70 includes a substrate 72 having a plurality of prism structures 74 integrally formed at a light output surface thereof. The prism sheet 70 can gather light beams to improve a brightness of an associated backlight module (not shown). However, the prism sheet 70 generally needs to cooperate with a diffusing sheet (not shown) in order to provide uniform light beams, which adds to the overall thickness and the cost of the backlight module.

Referring to FIG. 8, another conventional prism sheet 80 includes a plurality of prism structures 82, a substrate 84, and a diffusing layer 86 arranged in that order from top to bottom. The diffusing layer 86 includes a plurality of diffusing particles 861 formed therein, which enables the prism sheet 80 to uniformly emit light beams out from the prism structures 82. However, the diffusing layer 86 is generally a structure formed separately from the substrate 84, and therefore adds to the overall thickness of the prism sheet 80.

What is needed, therefore, is a prism sheet that can overcome the above-described deficiencies.

SUMMARY

A prism sheet includes a substrate and a plurality of prism structures. The substrate includes a plurality of diffusing particles dispersed therein. The prism structures are at a light output side of the substrate. The diffusing particles can diffuse light beams traveling through the substrate. The prism structures can gather light beams to improve a brightness of a backlight module incorporating the prism sheet.

Other advantages and novel features will become more apparent from the following detailed description when taken in conjunction with the accompanying drawings.

DETAILED DESCRIPTION OF PREFERRED EMBODIMENTS

Reference will now be made to the drawings to describe the preferred embodiments in detail.

Figure 1:
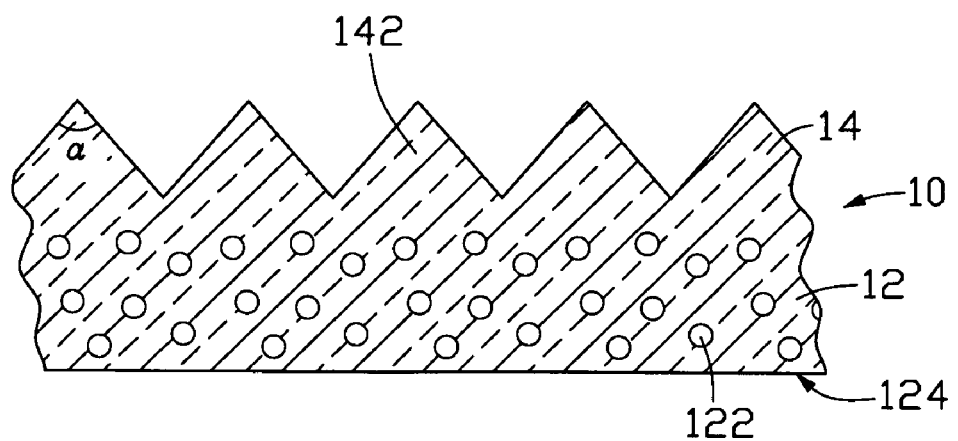
FIG. 1 is a side cross-sectional view of part of a prism sheet according to a first embodiment of the present invention.

FIG. 1 is a side cross-sectional view of part of a prism sheet according to a first embodiment of the present invention. The prism sheet 10 includes a substrate 12 and a plurality of prism structures 14 integrally formed thereon. The prism structures 14 are parallel to each other. Each prism structure 14 includes a portion 142 having a triangular cross-section. The triangular cross-section defines an acute apex angle $\alpha$. In the illustrated embodiment, the triangle of the triangular cross-section is an isosceles triangle. The substrate 12 includes a plurality of spherical diffusing particles 122 randomly dispersed therein, and a planar bottom surface 124 opposite to the prism structures 14.

The diffusing particles 122 can be formed together with the substrate 12 by an injection molding method, or be formed by a laser method or an ultrasonic method after injection molding of the substrate 12. The substrate 12 can be made from transparent material with a high refraction index and a high light transmission index, such as polyester, polycarbonate (PC) or polymethyl methacrylate (PMMA). The diffusing particles 122 can be made from silicon dioxide ($SiO_2$), aluminum oxide ($Al_2O_3$), or a same material as that of the substrate 12.

Advantageously, in the first embodiment, the prism sheet 10 includes the plurality of diffusing particles 122 formed in the substrate 12. The diffusing particles 122 can diffuse light beams traveling therethrough. Thus, the prism sheet 10 can diffuse light beams while having a reduced thickness.

Figure 2:
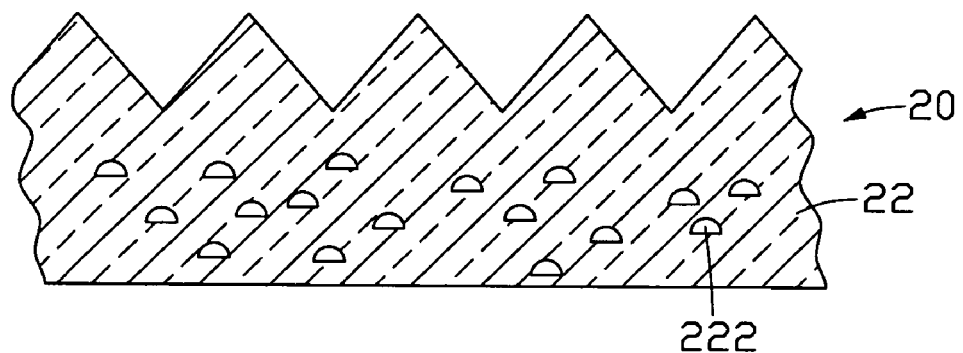
FIG. 2 is a side cross-sectional view of part of a prism sheet according to a second embodiment of the present invention.

FIG. 2 is a side cross-sectional view of part of a prism sheet according to a second embodiment of the present invention. The prism sheet 20 is similar to the prism sheet 10. However, a substrate 22 of the prism sheet 20 includes a plurality of hemispherical diffusing particles 222 dispersed therein.

Figure 3:
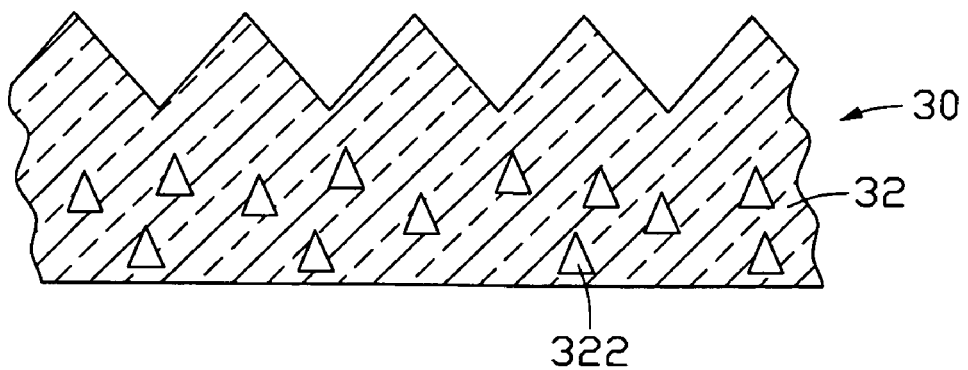
FIG. 3 is a side cross-sectional view of part of a prism sheet according to a third embodiment of the present invention.

FIG. 3 is a side cross-sectional view of part of a prism sheet according to a third embodiment of the present invention. The prism sheet 30 is similar to the prism sheet 10. However, a substrate 32 of the prism sheet 30 includes a plurality of conical diffusing particles 322 dispersed therein.

Figure 4:
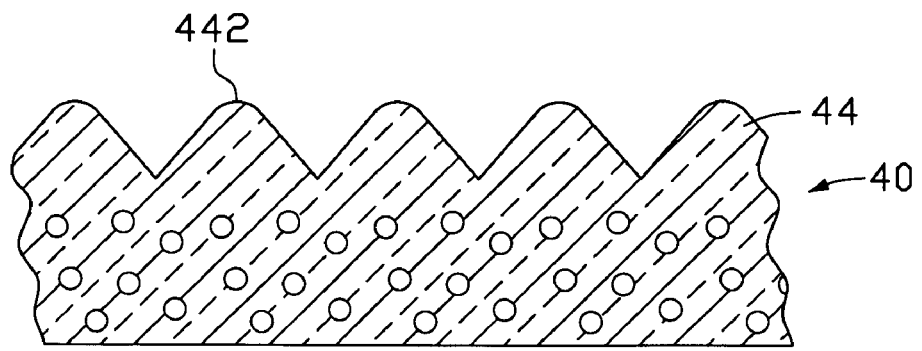
FIG. 4 is a side cross-sectional view of part of a prism sheet according to a fourth embodiment of the present invention.

FIG. 4 is a side cross-sectional view of part of a prism sheet according to a fourth embodiment of the present invention. The prism sheet 40 is similar to the prism sheet 10. However, each of prism structures 44 of the prism sheet 40 includes a portion 442 having a cross-section with tapering sides and a curved top. In the illustrated embodiment, the tapering sides are straight and symmetrical with respect to each other, and the curved top is arcuate.

Figure 5:
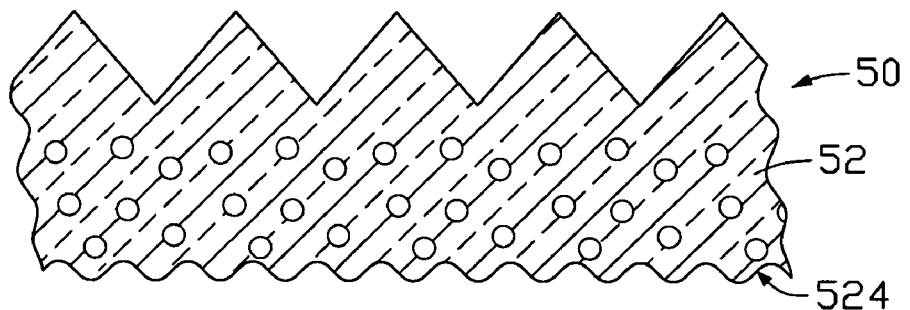
FIG. 5 is a side cross-sectional view of part of a prism sheet according to a fifth embodiment of the present invention.

FIG. 5 is a side cross-sectional view of part of a prism sheet according to a fifth embodiment of the present invention. The prism sheet 50 is similar to the prism sheet 10. However, a substrate 52 of the prism sheet 50 includes a wavy bottom surface 524.

Figure 6:
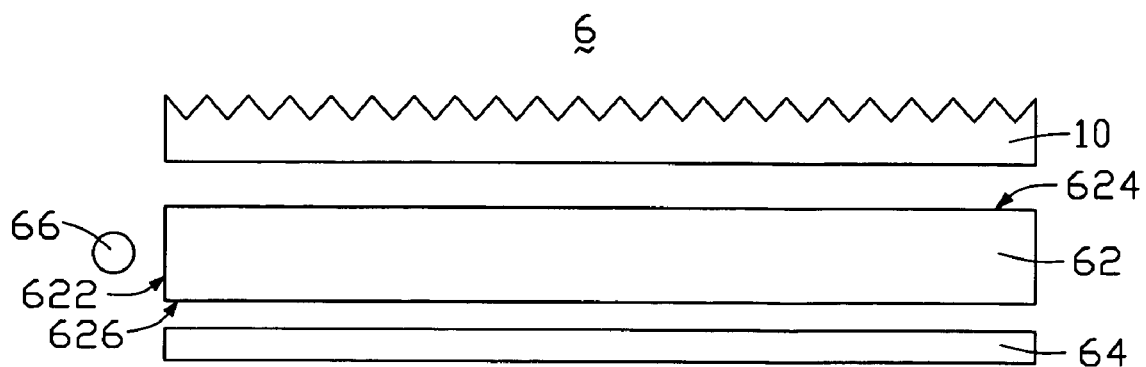
FIG. 6 is a schematic, exploded side view of a backlight module including the prism sheet of FIG. 1.
Figure 7:
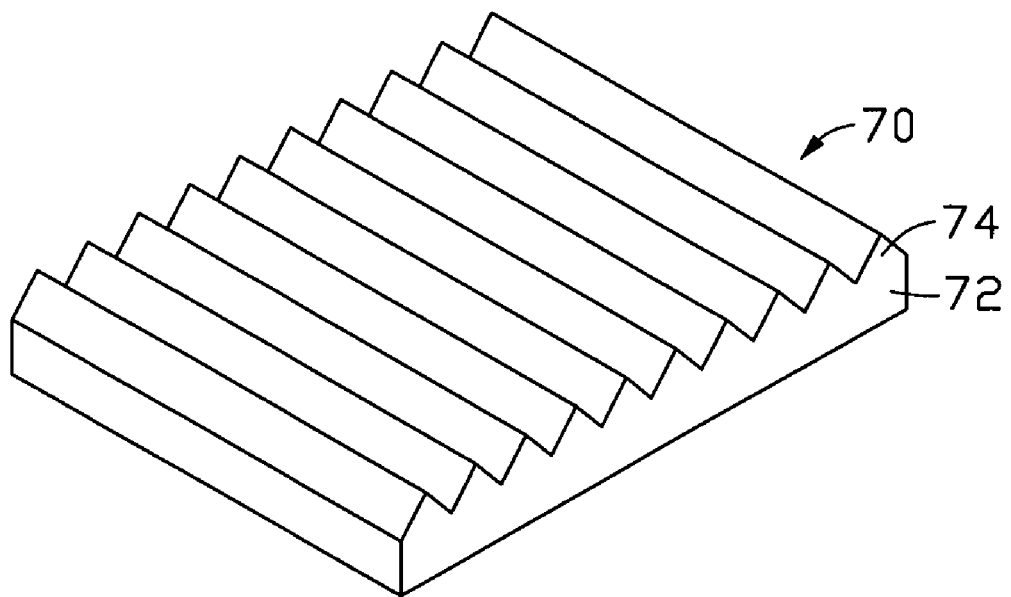
FIG. 7 is a schematic, isometric view of a conventional prism sheet.
Figure 8:
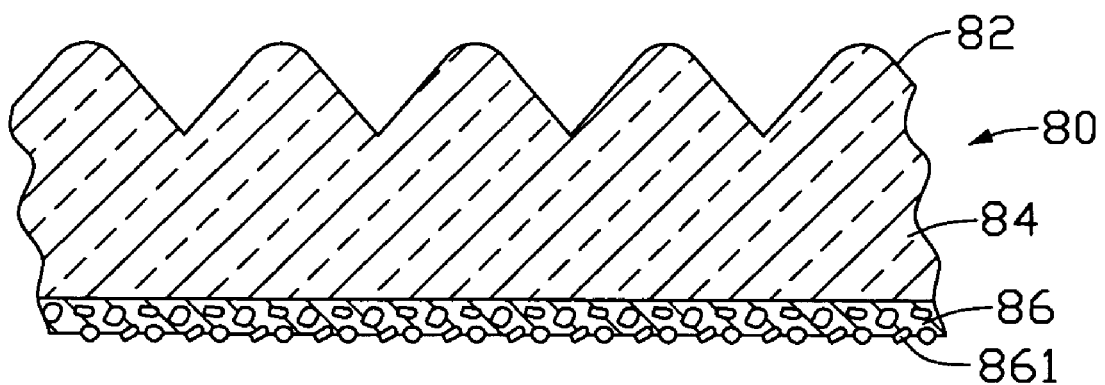
FIG. 8 is a side cross-sectional view of part of another conventional prism sheet.

Referring to FIG. 6, a backlight module 6 includes the prism sheet 10, a light guide plate 62, a reflective sheet 64, and a light source 66. The light guide plate 62 includes a light incident surface 622, a light emitting surface 624 adjoining the light incident surface 622, and a bottom surface 626 opposite to the light emitting surface 624. The light source 66 is disposed adjacent to the light incident surface 622 of the light guide plate 62. The prism sheet 10 is disposed adjacent to the light emitting surface 624 of the light guide plate 62. The reflective sheet 64 is disposed adjacent to the bottom surface 626 of the light guide plate 62.

Light beams emitted from the light source 66 enter the light guide plate 62 through the light incident surface 622. Some light beams emit directly out from the light guide plate 62 through the light emitting surface 624 and into the prism sheet 10. Other light beams emit from the light guide plate 62 through the bottom surface 626 and transmit to the reflective sheet 64. These light beams are reflected back to light guide plate 62, and finally emit from the light guide plate 62 through the light emitting surface 624 and into the prism sheet 10. The diffusing particles 122 in the substrate 12 can diffuse light beams traveling through the substrate 12. This configuration performs a similar function to that of a diffusing sheet of a conventional backlight module, therefore the backlight module 6 does not need a diffusing sheet. In addition, the prism sheet 10 can gather light beams to improve a brightness of the backlight module 6. Thus, the backlight module 6 can provide bright and uniform light at a low cost and while having a reduced thickness.

In alternative embodiments of various of the above-described embodiments, the apex angle of the cross-section portion of each prism structure can be a right angle or an obtuse angle. The sizes, density and distribution of the diffusing particles can be configured according to different requirements of various applications.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A prism sheet, comprising;
a substrate comprising a plurality of diffusing particles dispersed therein for diffusing light beams traveling through the substrate, and a plurality of prism structures at a light output side of the substrate, wherein the substrate and the diffusing particles are made from the same material.

2. The prism sheet as claimed in claim 1, wherein the prism structures are parallel to each other.

3. The prism sheet as claimed in claim 1, wherein the diffusing particles are spherical.

4. The prism sheet as claimed in claim 1, wherein the diffusing particles are hemispherical.

5. The prism sheet as claimed in claim 1, wherein the diffusing particles are conical.

6. The prism sheet as claimed in claim 1, wherein each prism structure comprises a portion having a cross-section with tapering sides and a curved top.

7. The prism sheet as claimed in claim 1, wherein each prism structure comprises a portion having a triangular cross-section.

8. The prism sheet as claimed in claim 7, wherein the triangular cross-section defines an acute apex angle.

9. The prism sheet as claimed in claim 7, wherein the triangular cross-section defines a right-angled apex angle.

10. The prism sheet as claimed in claim 7, wherein the triangular cross-section defines an obtuse apex angle.

11. The prism sheet as claimed in claim 1, wherein the substrate further comprises a bottom surface at a side thereof opposite to the side having the prism structures.

12. The prism sheet as claimed in claim 11, wherein the bottom surface is planar.

13. The prism sheet as claimed in claim 11, wherein the bottom surface is wavy.

14. The prism sheet as claimed in claim 1, wherein the substrate is made from polyester, polycarbonate, or polymethyl methacrylate.

15. The prism sheet as claimed in claim 1, wherein the diffusing particles are made from polyester, polycarbonate, or polymethyl methacrylate.

16. A backlight module, comprising;
a light guide plate, comprising a first surface; and
a prism sheet disposed adjacent to the first surface of the light guide plate, comprising;
a substrate comprising a plurality of diffusing particles dispersed therein for diffusing light beams traveling through the substrate; and a plurality of prism structures at a light output side of the substrate, wherein the substrate and the diffusing particles are made from the same material.

17. The backlight module as claimed in claim 16, wherein the light guide plate further comprises a second surface opposite to the first surface.

18. The backlight module as claimed in claim 17, further comprising a reflective sheet disposed adjacent to the second surface of the light guide plate.

19. A backlight module, comprising;
a light guide plate, comprising a first surface; and
a prism sheet disposed adjacent to the first surface of the light guide plate, comprising;
a substrate comprising a plurality of diffusing structures dispersed therein for diffusing light beams traveling through the substrate; and a plurality of prism structures at a light output side of the substrate wherein the substrate and the diffusing structures are made from the same material.

* * * * *